(12) United States Patent
Kavaiya et al.

(10) Patent No.: US 8,250,249 B1
(45) Date of Patent: Aug. 21, 2012

(54) PROCESSOR INDEPENDENT LINE DRIVING AND RECEIVING SYSTEM

(75) Inventors: Gaurang Kavaiya, San Jose, CA (US);
Rick Harding, San Jose, CA (US);
Mark Ainsworth, San Jose, CA (US);
Bert Sullam, Bellevue, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 214 days.

(21) Appl. No.: 12/509,394

(22) Filed: Jul. 24, 2009

Related U.S. Application Data

(63) Continuation of application No. 12/509,384, filed on Jul. 24, 2009.

(60) Provisional application No. 61/083,893, filed on Jul. 25, 2008.

(51) Int. Cl.
*G06F 3/00* (2006.01)

(52) U.S. Cl. .............................. 710/19; 710/15; 710/22

(58) Field of Classification Search ........................ None
See application file for complete search history.

(56) References Cited

U.S. PATENT DOCUMENTS

| | | | |
|---|---|---|---|
| 4,745,514 A * | 5/1988 | Takeshima et al. | ........... 361/154 |
| 4,964,140 A | 10/1990 | Yonekura | |
| 6,401,174 B1 * | 6/2002 | Hagersten et al. | ............ 711/147 |
| 6,703,866 B1 | 3/2004 | Arimilli et al. | |
| 7,383,380 B2 | 6/2008 | Yagisawa et al. | |
| 7,685,340 B1 * | 3/2010 | Gaither | ........................ 710/69 |
| 7,694,035 B2 | 4/2010 | Chen et al. | |
| 8,145,812 B1 | 3/2012 | Kavaiya et al. | |
| 2002/0093512 A1 * | 7/2002 | Tseng | ........................ 345/619 |
| 2005/0081087 A1 * | 4/2005 | Yagisawa et al. | ................ 714/5 |
| 2005/0231764 A1 * | 10/2005 | Michiie et al. | ............... 358/1.16 |
| 2007/0080702 A1 * | 4/2007 | Fishman et al. | .............. 324/765 |
| 2009/0006666 A1 * | 1/2009 | Chen et al. | ..................... 710/23 |

OTHER PUBLICATIONS

Chen, "Fast-Offset-cancellation Single-to-differential Stage for Burst-mode Receiver Design," 2005, IEEE, pp. 369-372.
USPTO Non-Final Rejection for U.S. Appl. No. 12/509,384 dated Jul. 18, 2011; 11 pages.
USPTO Non-Final Rejection for U.S. Appl. No. 12/509,384 dated Feb. 2, 2011; 10 pages.
USPTO Notice of Allowance for U.S. Appl. No. 12/509,384 dated Oct. 27, 2011; 5 pages.
USPTO Notice of Allowance for U.S. Appl. No. 12/509,384 dated Feb. 3, 2012; 8 pages.

* cited by examiner

*Primary Examiner* — Chun-Kuan Lee
*Assistant Examiner* — Dayton Lewis-Taylor

(57) ABSTRACT

A programmable system includes a core processing unit to perform various data operations. The programmable system includes a transceiver having programmable analog and digital devices that, when initially configured by the programmable system, receive and collect status information of other programmable systems independently of the data operations performed by the core processing unit.

20 Claims, 7 Drawing Sheets

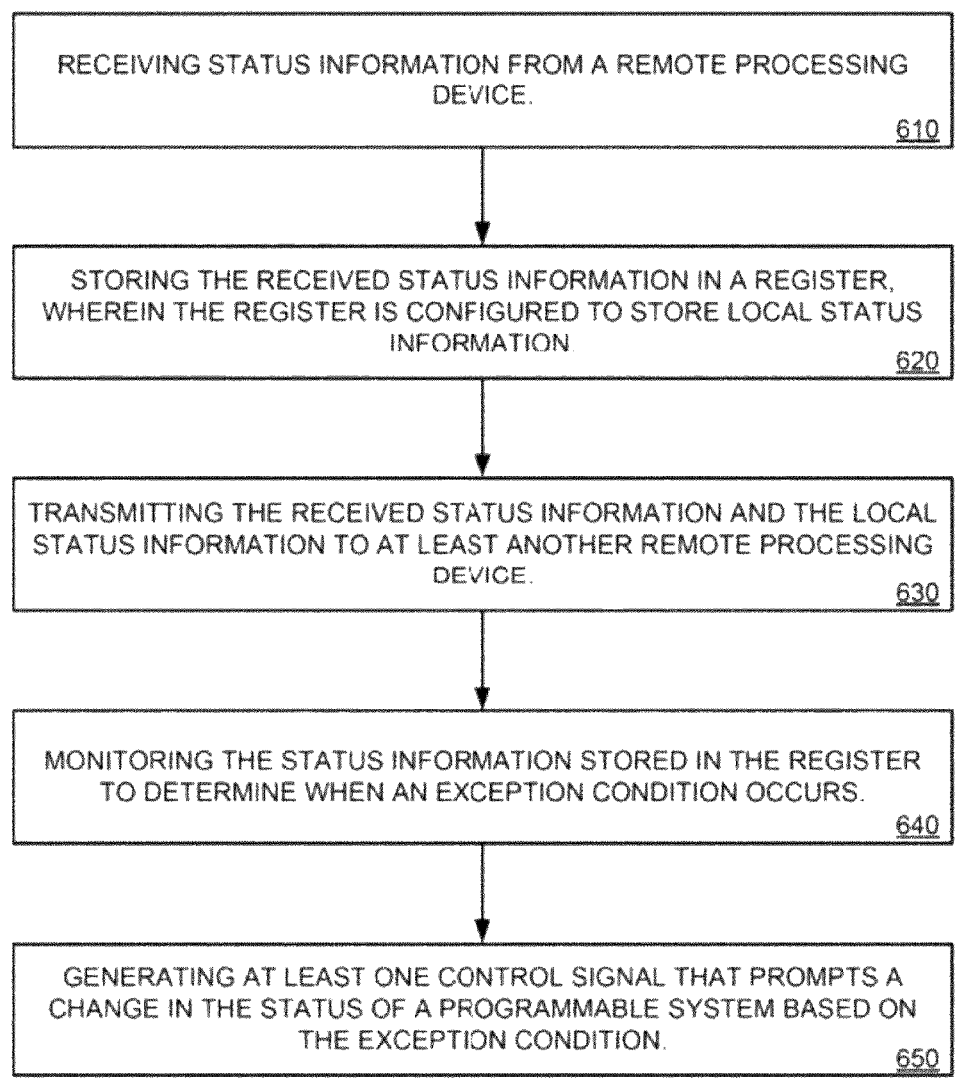

PROCESSOR INDEPENDENT LINE DRIVING AND RECEIVING SYSTEM

RELATED APPLICATIONS

This patent application is a continuation of U.S. patent application Ser. No. 12/509,384, filed Jul. 24, 2009, and also claims benefit of and priority to U.S. Provisional Patent Application No. 61/083,893, filed Jul. 25, 2008, both of which are incorporated by reference herein.

TECHNICAL FIELD

This disclosure relates generally to electronic circuits, and more particularly to a processor-independent line driving and receiving system.

BACKGROUND

Many electronic systems include multiple on-board processing devices that can communicate with each other, for example, through differential signaling. Differential signaling is often utilized by these processing devices, as it provides greater noise immunity and allows for longer signal routes.

SUMMARY

This patent application discloses a processing system to direct performance of data operations for the device and a transceiving system including programmable analog and digital components that are configurable by the processing system. The transceiving system, when initially configured by the processing system, to exchange and monitor status information of one or more remote processing systems with the programmable analog and digital components independent of the processing system.

In some embodiments, a system includes multiple programmable systems that each include a core processing unit to perform various data operations. The multiple programmable systems each include a transceiver having programmable analog and digital devices that, when initially configured by their respective programmable systems, receive and collect status information of other programmable systems independently of the data operations performed by the core processing unit.

In some embodiments, a method includes receiving status information from a remote processing device with differential signaling, and storing the received status information in a register. The register is also configured to store local status information. The method further includes transmitting the received status information and the local status information to at least another remote processing device with differential signaling.

DESCRIPTION OF THE DRAWINGS

FIG. 6 is an example operational flowchart for the operation of the programmable systems according to embodiments of the invention.

DETAILED DESCRIPTION

A programmable system on a chip (PSOC) or other electronic system can include a core processing device and programmable analog and/or digital components that can work in conjunction to perform various data operations. These programmable analog and/or digital components can be configured to implement a processor-independent transceiving system to communicate with other programmable systems without involving the core processing device. In some embodiments, the programmable system on a chip can utilize the transceiving system to exchange status information, such as operating temperature and current consumption, with the other programmable systems. The transceiving system can monitor the status information of all of the programmable systems for variances or exception conditions and then proactively attempt to address the variances without burdening the processing device of the programmable system on a chip. Embodiments are shown and described below in greater detail.

Figure 1A:
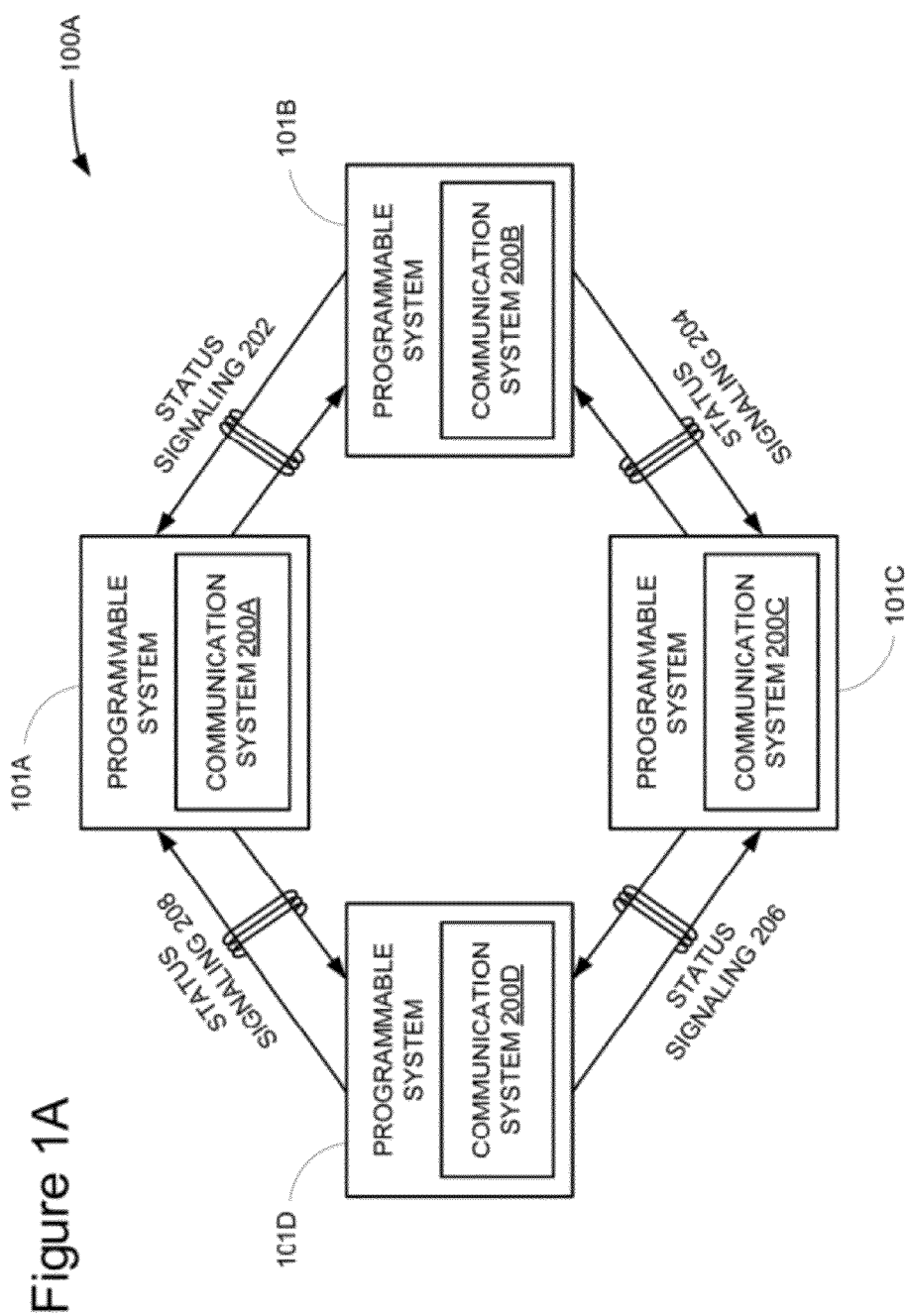
FIGS. 1A and 1B are block diagrams of example system configurations allowing multiple programmable systems to communicate status information with each other according to embodiments of the invention.
Figure 1B:
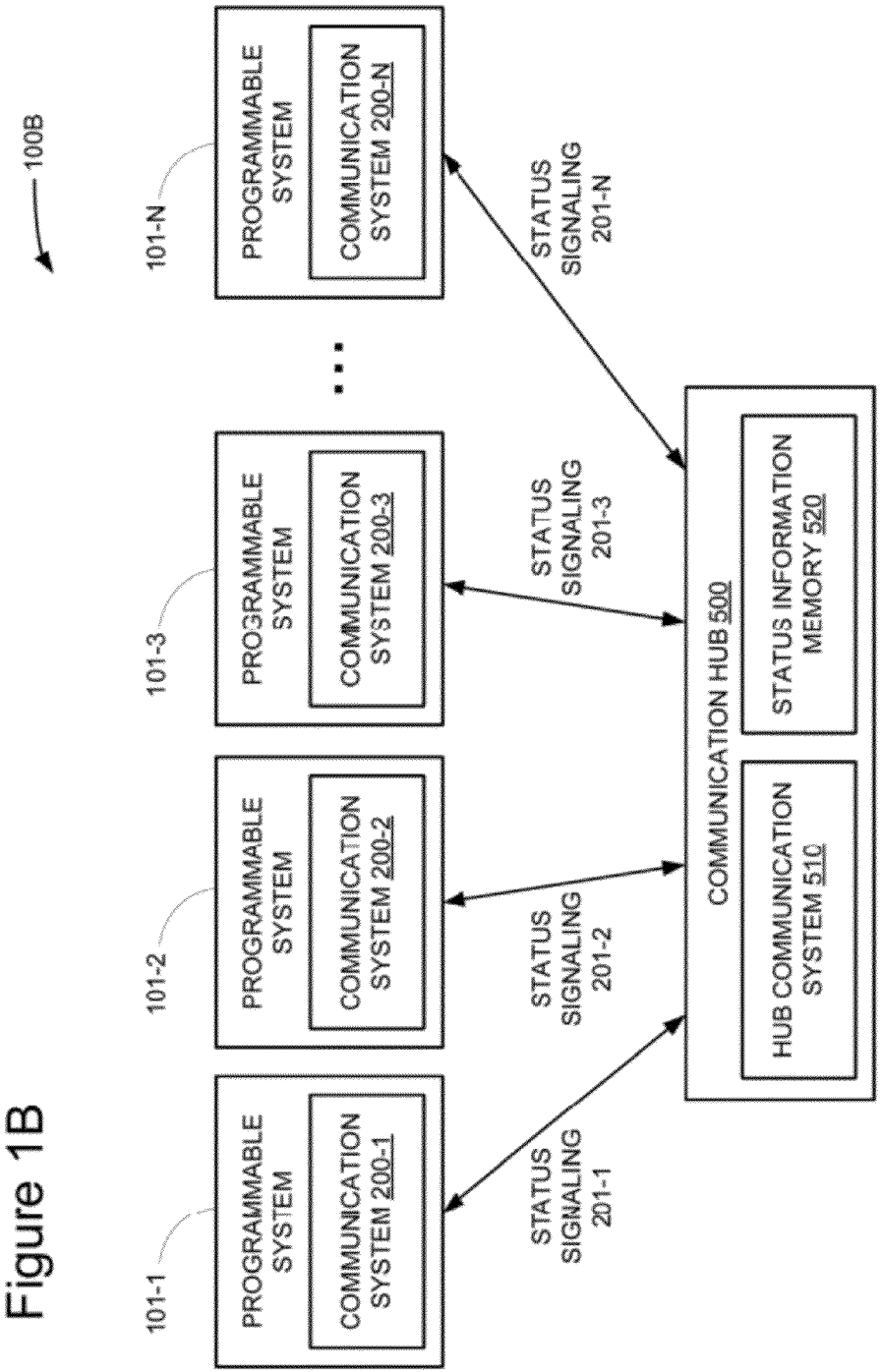

FIGS. 1A and 1B are block diagrams of example system configurations allowing multiple programmable systems to communicate status information with each other according to embodiments of the invention. Referring to FIG. 1A, a system 100A includes multiple programmable systems 101A-D capable of performing various data processing operations, as directed by a core processing device (not shown) in each of the programmable systems 101A-D. As will be discussed later in greater detail, the programmable systems 101A-D include programmable analog and digital components (not shown) that, when configured by the core processing device, can implement various analog and digital hardware components, such as a analog-to-digital converters, signal filters, etc, that can manipulate data signals received by the programmable systems 101A-D.

The multiple programmable systems 101A-D can each include a communication system 200A-D, respectively, allowing the multiple programmable systems 101A-D to communicate with each other. These communication systems 200A-D are processor-independent, i.e., they can operate independently of the core processing devices of the multiple programmable systems 101A-D. In other words, the multiple programmable systems 101A-D can exchange information with each other without involving the core processing devices of the multiple programmable systems 101A-D or consuming the processing resources of the core processing devices. The communication systems 200A-D can be implemented in hardware, and, in some embodiments, the programmable systems 101A-D can dynamically configure programmable analog and digital components in the programmable systems 101A-D into the communication systems 200A-D.

The multiple programmable systems 101A-D can be arranged in a ring configuration that allows the communication systems 200A-D to receive status information from at least one neighboring programmable system, e.g., through status signaling 202, 204, 206, or 208. The communication systems 200A-D can store the status information alongside its locally-detected status information, and transmit the received status information along with its local status information to at least another neighboring programmable system. Since each communication system 200A-D can transmit status information of all of the multiple programmable systems 101A-D, each communication system 200A-D can locally store the status of all of the multiple programmable systems 101A-D even when certain communication systems 200A-D do not directly communicate with each other. In some embodiments, the multiple programmable systems 101A-D can be arranged to implement multiple rings, allowing for quicker availability to status information from the programmable systems 101A-D.

The communication systems 200A-D can also monitor the status of the programmable systems 101A-D through the status information, and in some embodiments, the communication systems 200A-D can prompt corrective action when the monitored status deviates from a predetermined level or range. The communication systems 200A-D can further monitor the status of the programmable systems 101A-D and prompt corrective action without involving the core processing devices. In some embodiments, the corrective action can include alerting a user or administrator of the variance in status, for example, by activating an alert device, such as a light-emitting diode (LED) light or other annunciation device. The corrective action can also include activating or deactivating cooling devices or shedding current consuming loads controlled or utilized by the programmable systems 101A-D in an attempt to change the deviant status. Embodiments of the acquisition, distribution, and monitoring of status information, as well as the various corrective actions that can be prompted by the communication systems 200A-D will be described below in greater detail.

Referring to FIG. 1B, the system 100B includes multiple programmable systems 101-1 to 101-N that are similar to the programmable systems 101A-D shown and described above in FIG. 1A. The programmable systems 101-1 to 101-N each include a communication system 200-1 to 200-N that can exchange status information with a communication hub 500. The communication systems 200-1 to 200-N are similar to the communication systems 200A-D shown and described above in FIG. 1A, in that they operate independently of core processing devices (not shown) in the programmable systems 101-1 to 101-N. In other words, the communication systems 200-1 to 200-N can send and receive status information with the communication hub 500 without utilizing processing resources of the core processing devices in the programmable systems 101-1 to 101-N.

The communication hub 500 can include a hub communication system 510 to receive status information from each of the programmable systems 101-1 to 101-N, e.g., through status signaling 201-1 to 201-N. The communication hub 500 includes a status information memory 520 to store the status information that the communication hub system 510 receives from the programmable systems 101-1 to 101-N. The hub communication system 510 can send status information of all of the programmable systems 101-1 to 101-N to the communication systems 200-1 to 200-N. Embodiments of the communication hub 500 will be described below in greater detail.

Figure 2:
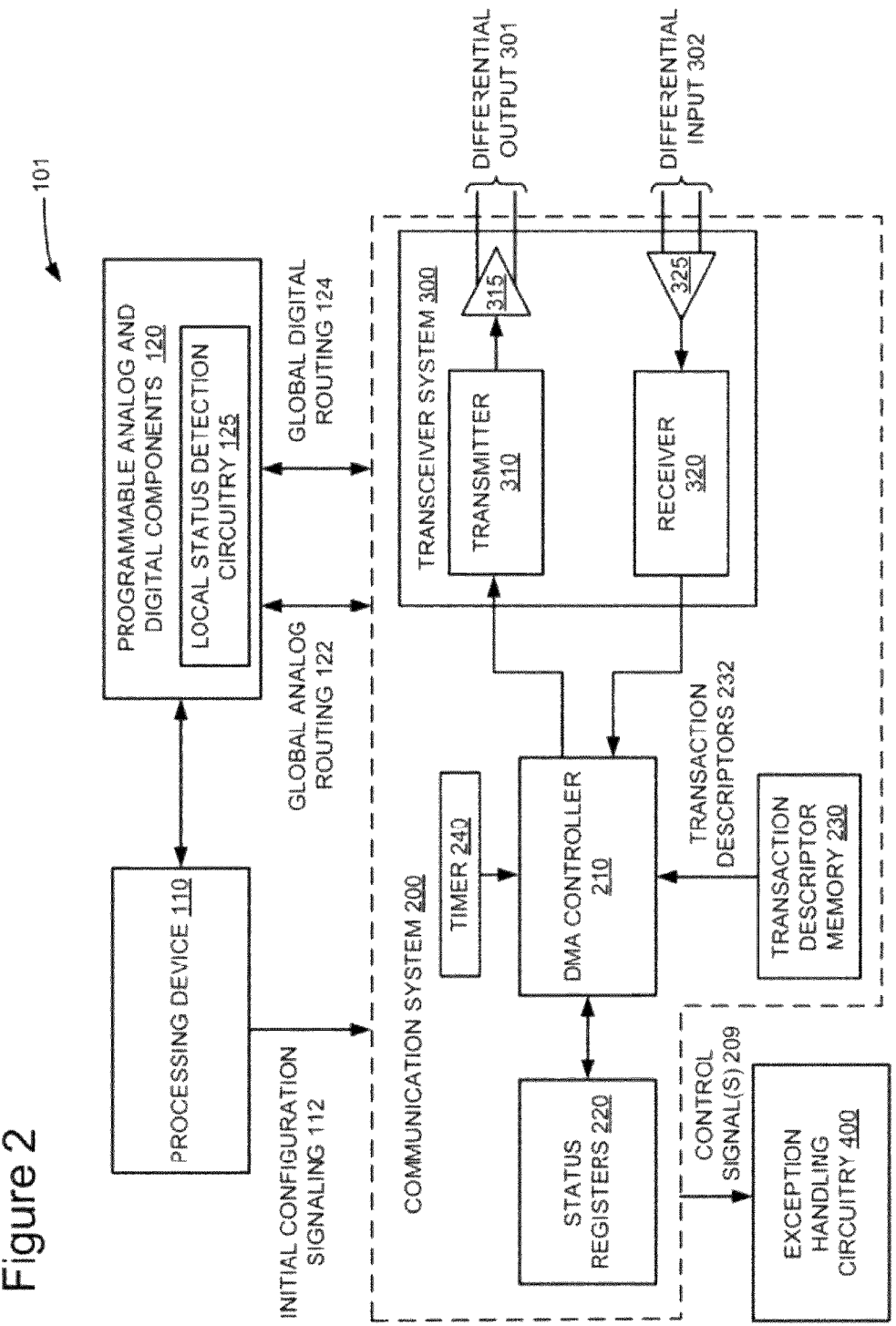
FIG. 2 is a block diagram example of a programmable system shown in FIGS. 1A and 1B.

FIG. 2 is a block diagram example of a programmable system shown in FIGS. 1A and 1B. Referring to FIG. 2, the programmable system 101 includes a processing device 110 and programmable analog and digital components 120 that, when configured by the processing device 110, can implement various analog and digital hardware components, such as a analog-to-digital converters, signal filters, etc, that can manipulate data signals received by the programmable system 101. The processing system 110 can include one or more processors and at least one memory device to store instructions that, when executed by the one or more processors, can configure the programmable analog and digital components 120 or perform various of processing tasks for the programmable system 101.

In some embodiments, the programmable analog and digital components 120 can be configured to include local status detection circuitry 125 that can detect status information of the programmable system 101. The status information can include a temperature associated with the programmable system 101, a current consumption associated with the programmable system 101, and/or other performance indicators that the programmable system 101 wants a communication system 200 to collect and possibly monitor independent of the processing system 110. The local status detection circuitry 125 can provide the detected status information of the programmable system 101 to the communication system 200 for storage, and possibly monitoring, via global analog routing 122 and/or global digital routing 124.

The programmable system 101 includes a communication system 200 to exchange status information with other programmable systems without burdening the processing resources of the processing device 110. As discussed above, the programmable system 101 can exchange status information directly with the other programmable systems or can exchange the status information indirectly through a communication hub 500.

The communication system 101 includes a transceiving system 300 to transmit and receive status information of other programmable systems, for example, through a differential output 301 and a differential input 302. In some embodiments, the differential output 301 and differential input 302 at least partially comply with a low voltage differential signaling (LVDS) specification. Although FIG. 2 shows the communication system 200 exchanging differential signals, in some embodiments, the transceiver system 300 can input and output signals other than differential signals.

The transceiving system 300 includes a transmitter 310 to receive status information to be transmitted to at least another programmable system and to format the status information into a form compatible for transmission based on a transmission protocol. For instance, the transmitter 310 can append a preamble to the status information allowing a receiving programmable system to understand that the transmission includes status information. In some embodiments, the transmitter 310 can also generate an inverse version of the status information to be added to the data to be transmitted, which can be used for transmission error detection. The transmitter 310 can provide the single-ended transmission data to a differential output device 315 that can generate a differential output 301 from the single-ended transmission data.

The transceiving system 300 includes a differential input device 325 to receive a differential input 302 that includes status information from at least another programmable system. The differential input device 325 can generate a single-ended version of the differential input and provide the single-ended input to a receiver 320. The differential input 302 can be formatted similarly to the differential output 301, i.e., according to the transmission protocol. The receiver 320 can perform various operations on the single-ended input, such as verify that the differential input 302 conformed to the transmission protocol and extract the status information. For instance, the receiver 320 can verify a preamble indicates the input includes status information, and can check the input for transmission error. Embodiments of the transceiver system 300 will be described below in greater detail.

The communication system 200 includes status registers 220 to store status information detected locally in the programmable system 101, for example, by the local status detection circuitry 125, and store received status information of other programmable systems. The communication system 200 includes a direct memory access (DMA) controller 210 to transfer status information to and from the status registers 220 based on transaction descriptors 232 in a transaction descriptor memory 230. For instance, when status information is received by the transceiving system 300, the DMA controller 210 can retrieve one or more transaction descriptors that prompt the DMA controller 210 to transfer the received status information to the status registers 220.

The communication system 200 can include a timer 240 to send signals to the DMA controller 210, which prompt the DMA controller 210 to transfer status information from the status registers 220 to the transceiving system 300 for output. In some embodiments, the signals from the timer 240 can be periodic, allowing the communication system 200 the ability to transmit the contents of the status registers to other programmable systems or to a communication hub 500 independently of the processing system 110.

In some embodiments, the number of DMA channels utilized by the communication system 200 can be dependent on the configuration of the overall system 100. For instance, when in a ring configuration, the DMA controller 210 can have a DMA channel for each ring that is implemented. When in a centralized hub configuration, the DMA controller 210 can implement a DMA reception channel for each port of the communication hub 500, i.e., the number programmable systems 101 coupled to the communication hub 500. In some embodiments, the communication system 200 can be dynamically reconfigured, for example, by the processing device 110, to work in a ring configuration or a centralized hub configuration.

The communication system 200 can monitor the status information in the status registers 220 to determine when an exception condition occurs. An exception condition can occur when the status information indicates that one or more parameters of a programmable system have deviated from a predetermined normal operating range or level. For instance, the status information can include a current consumption parameter for each of the programmable systems, and the communication system 200 can monitor the current consumption parameters, of individual programmable systems or as an aggregate of all of the programmable systems, to determine whether it has risen above a preset threshold. In another example, the status information can include a temperature of the programmable systems, and the communication system 200 can monitor a temperature parameter of the status information to determine when a temperature of at least one of the programmable systems is no longer within a preset range or has exceeded a preset level. This monitoring of the status information for the programmable systems can be performed without any involvement by the processing system 110.

The programmable system 101 includes exception handling circuitry 400 to take an action when the monitored status information indicates that an exception condition has arisen. The exception handling circuitry 400 can receive one or more control signals 209 from the communication system 200 indicating that an exception condition has occurred, and can perform a predetermined action responsive to the control signals 209. In some embodiments, the predetermined action can be to alert a user of the exception condition, for example, through an annunciation technique. The predetermined action can also be a corrective action, such as turning on or turning off a fan based on the monitored temperature, or to shed load that are consuming current when the monitored status information indicates current consumption exceeds a predetermined threshold. Embodiments of the exception handling circuitry 400 will be described below in greater detail.

Figure 3:
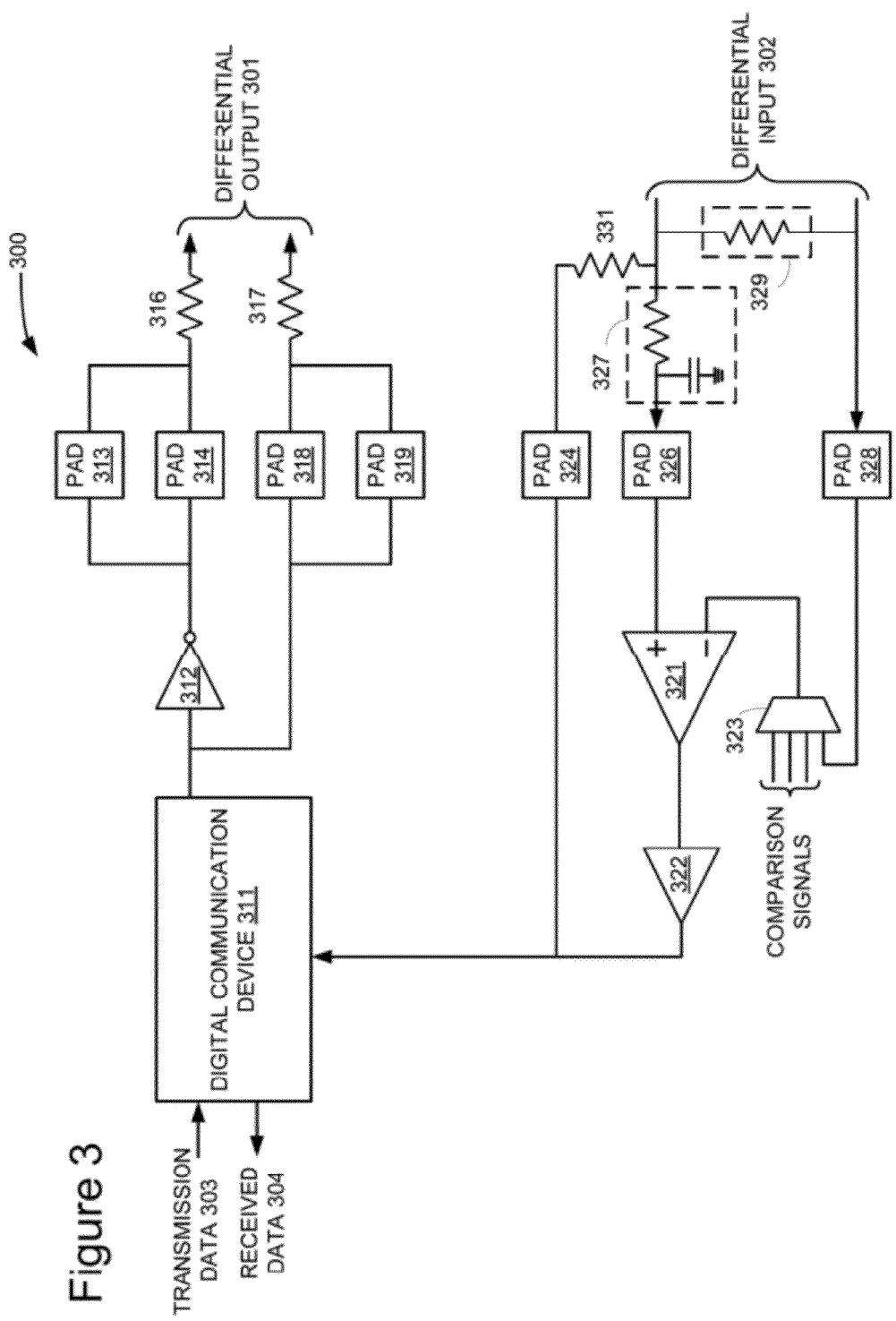
FIG. 3 is a block diagram example of a transceiver system shown in FIG. 2.

FIG. 3 is a block diagram example of a transceiver system 300 shown in FIG. 2. Referring to FIG. 3, the transceiver system 300 includes a digital communication device 311 to receive transmission data 303, for example, status information from the status registers 220 via the DMA controller 210, and format the transmission data 303 for transmission as a differential output 301. The digital communication device 311 can also extract status information or received data 304 from a differential input 302. In some embodiments, the digital communication device 311 can be a universal asynchronous receiver/transmitter (UART), a serial peripheral interface (SPI), or custom device or system.

The transceiving system 300 can be implemented by programmable analog and digital components that can be configured by the processing device 110 to transmit and receive differential signals based, at least in part, on the low voltage differential signal (LVDS) specification. In some embodiments, the transceiving system 300 can include one or more special input/output (SIO) interfaces having programmable input and output threshold levels to accommodate low voltage signaling, general purpose input/output (GPIO) interfaces can implement various pads, and multiple universal digital blocks (UDBs) configurable to implement the digital communication device 311 when configured by the processing device 110.

For data transmissions, the digital communication device 311 can encode the status information from the status registers 220 according to a transmission protocol. In some embodiments, the digital communication device 311 can build transmission data by appending a preamble to the status information and also generating and adding an inverted version of the status information to the transmission data. The transmission data can be provided to output pad 318. The transmission data can also be inverted by the inverter 312 before being provided to output pad 314. The transmission data provided to the output pads 314 and 318 make up the differential output 301. In some embodiments, additional pads 313 and 319 can be added in parallel to output pads 314 and 318, respectively, to increase drive strength of the differential output 301, for example, when driving low impedance loads. The differential output 301 can include resistors 316 and 317, which can be configured or sized to ensure a certain current flow can occur between the differential signal paths at the receiving end in based on specifications from a low voltage differential signaling standard. In some embodiments, the current flow between the differential signal paths can be set to approximately 3.5 mA.

For data receptions, the differential input 302 can be received by several input pads 324, 326, and 328. Prior to reception at the input pads, the transceiver system 300 can include various electrical components 327 and 329 to tune the voltage difference between the two differential signal paths. Electrical component 327 can be a combination of a resistor and a capacitor to filter or tune at least one of the signal lines of the differential input 302. Electrical component 329 can include one or more resistors coupled between the signal lines of the differential input 302. The transceiver system 300 can include resistor 331 to provide an adequate current flow to the input pad 324.

The differential input 302 received by input pad 326 is provided to a comparator 321, while the differential input 302 received by input pad 328 is provided to a multiplexer 323 along with one or more comparison signals. The multiplexer 323 selects one of the inputs to be provided to the other input of the comparator 321 for comparison with the signal from input pad 326. The output of the comparator 321 is provided to an analog-to-digital converter 322 and subsequently provided to the digital communication device 311. In some embodiments, the output of the analog-to-digital converter 322 can be fed back to the comparator 321 as a comparison signal to reduce hysteresis in the comparator. The input received at input pad 324 is provided to the digital communication device 311 for status information extraction and error detection.

The digital communication device 311 can decode the input received from the input pad 324 and the analog-to-digital converter 322 to determine that the differential input 302 includes status information. The digital communication device 311 can extract the status information or received data 304 from decoded input according to a transmission protocol and forward the status information to the status registers 220 via the DMA controller 210.

Figure 4:
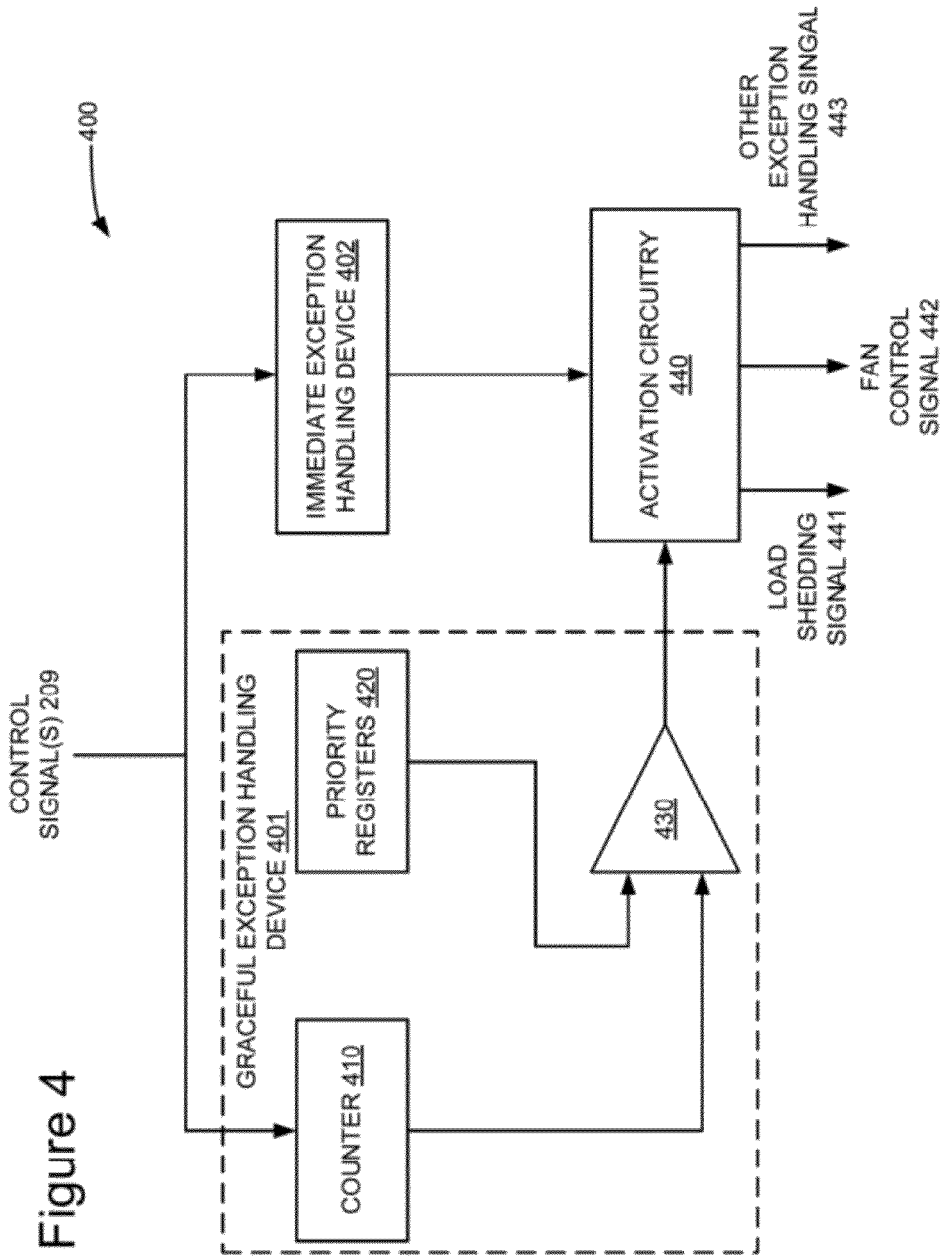
FIG. 4 is a block diagram example of an exception handling circuitry shown in FIG. 2.

FIG. 4 is a block diagram example of an exception handling circuitry 400 shown in FIG. 2. Referring to FIG. 4, the exception handling circuitry 400 receives control signals 209 from the communication system 200 indicating one or more of the programmable systems 101 have an exception condition. The exception handling circuitry 400 can generate one or more output signals, such as a load shedding signal 441, a fan control signal 442, and/or other exception handling signal 443, in an attempt to address the exception condition.

The exception handling circuitry 400 can include a graceful exception handling device 401 and an immediate exception handling device 402 to receive the control signals 209 and to direct activation circuitry 440 to generate one or more of the output signals 403-405. The immediate exception handling device 402, upon notification of an exception condition in the status information, can take immediate action to remove the exception condition. For instance, when there is excess current consumption, the immediate exception handling device 402 can direct the activation circuitry 440 to shed all loads immediately through a load shedding signal 403. In some embodiments, the number of loads that are shed can be fewer than all of the loads, but still preset to be shed upon notification of the exception condition.

The graceful exception handling device 401 can implement a gradual approach to curing an exception condition by incrementally prompting the activation circuitry 440 to send signals 403-405 over time. For example, when there is excess current consumption, the graceful exception handling device 401 can direct the activation circuitry 440 to incrementally shed loads through a load shedding signal 403 until the exception condition is remedied.

The graceful exception handling device 401 includes a priority register 420 to store a prioritized list of exception actions. For instance, in a load shedding situation, the priority register 420 can include a prioritized list of loads to be shed. When the graceful exception handling device 401 receives a control signal 209, the graceful exception handling device 401 can start a counter 410 to increment with a predetermined frequency. The graceful exception handling device 401 includes a comparator 430 to compare the priority registers 420 with a value of the counter 410. When the comparator 430 finds a match between the counter 410 and the priority register 420, the comparator 430 prompts the activation circuitry 440 to issue at least one of the signals 403-405. En the load shedding example, the comparator 430 can prompt the activation circuitry 440 to issue a load shedding signal 403 that sheds the load identified in the priority register 420 as matching the counter 410.

The implementation of the counter 410 and priority register 420 allows for a time-based approach to exception handling and also allows the exception handling circuitry 400 the ability to handle exception conditions, such as over current conditions or overheating conditions, without involving the processing device 110.

When each programmable system 101 includes a similar graceful exception handling device 401, the exception handling can be performed in a distributed manner across the overall system 100. For instance, when an overheating condition arises, different programmable systems can be prompted to turn on one or more fans to help airflow and cooling over time based on their priority registers 420. Similarly, in an over current situation, the shedding of loads to reduce the current consumption can be spread across any number of the programmable systems.

Figure 5:
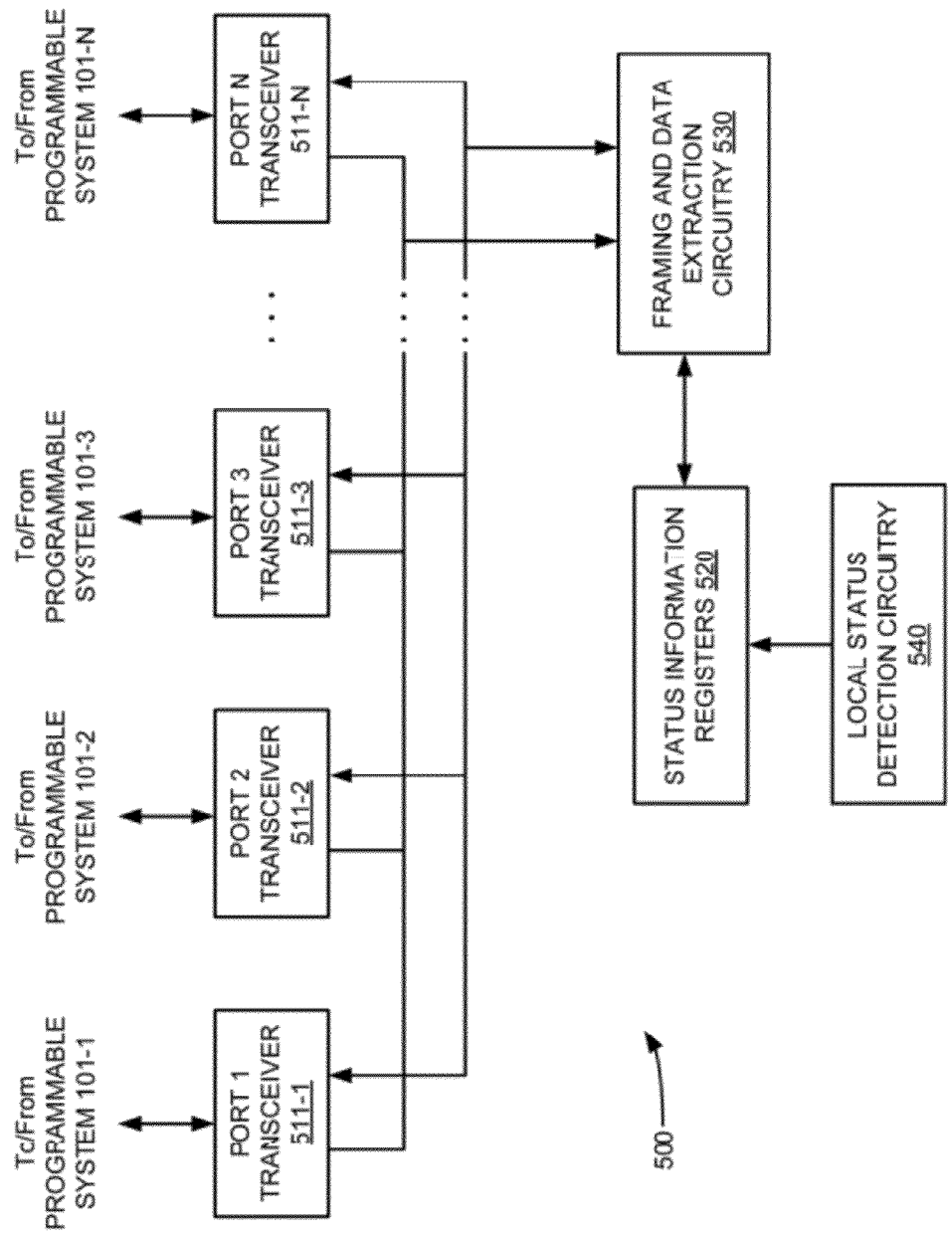
FIG. 5 is a block diagram example of a communication hub shown in FIG. 1B.

FIG. 5 is a block diagram example of a communication hub 500 shown in FIG. 1B. Referring to FIG. 5, the communication hub 500 includes multiple port transceivers 511-1 to 511-N to exchange status information with the programmable systems 101-1 to 101-N. The port transceivers 511-1 to 511-N can receive signaling that includes status information from the programmable systems 101-1 to 101-N and forward the signaling to framing and data extraction circuitry 530. The framing and data extraction circuitry 530 can decode and extract the status information from the signaling, and store the status information in status information registers 520. In some embodiments, the framing and data extraction circuitry 530 stores the status information to the status information registers 520 through DMA operations.

The communication hub 500 can include a local status detection circuitry 540 to detect a local status of the communication hub 500. The local status detection circuitry 540 can add the local status information to the status information registers 520, for example, through DMA operations. In some embodiments, the communication hub 500 can monitor the status information in the status information registers 520 for exception conditions and also perform various exception handling tasks, similar to those performed by the programmable systems 101-1 to 101-N.

During data transmission operations, the communication hub 500 transfers the status information stored in the status information registers 520 to the framing and data extraction circuitry 530. The framing and data extraction circuitry 530 can encode the status information according to a transmission protocol. For instance, the framing and data extraction circuitry 530 can append a preamble to the status information. The framing and data extraction circuitry 530 can also generate the inverse of the status information and add the inverse of the status information to the transmission signaling.

The framing and data extraction circuitry 530 can provide the transmission signaling to each of the port transceivers 511-1 to 511-N for transmission to the programmable systems 101-1 to 101-N. In some embodiments, the framing and data extraction circuitry 530 can prepare the status information for transmission to the programmable systems 101-1 to 101-N periodically, for example, based on a timer.

FIG. 6 is an example operational flowchart for the operation of the programmable systems according to embodiments of the invention. Referring to FIG. 6, in a block 610, the communication system is configured to receive status information of a remote processing device. The communication system can receive the status information directly from the remote processing device or indirectly through a centralized hub. The communication system can receive the status information without involving the processing device of the programmable system. The status information can be embedded in a packetized signal based on a transmission protocol. The communication system can decode packetized signal according to the transmission protocol and extract the status information from the packetized signal.

In a block 620, the communication system is configured to store the received status information in a register. The communication system can include a DMA controller to transfer the received status information to the register through DMA operations. The register is configured to store local status information that can be detected by various other components in the programmable system. The communication system can store the status information without involving the processing device of the programmable system.

In a block 630, the programmable system is configured to transmit the received status information and the local status information to at least another remote processing device. The communication system can utilize the DMA controller to transfer the status information from the register to a transmitter. The transmitter can encode the status information into a packetized signal according to a transmission protocol, i.e., add a preamble and an inverse version of the status information, before transmitting the packetized signal to at least one programmable system. The communication system can transmit the status information from the register without involving the processing device of the programmable system.

In some embodiments, the programmable system can transmit the packetized signal that includes the received status information and the local status information to a centralized hub. The centralized hub can relay the received status information and the local status information to the at least another remote processing device.

In a block 640, the communication system is configured to monitor the status information stored in the register to determine when an exception condition occurs. The communication system can monitor the status information stored in the register without involving the processing device of the programmable system.

In some embodiments, the exception condition can indicate that one or more programmable systems detected excessive temperature or that there is excessive current consumption by one or more of the programmable systems.

In a block 650, the communication system is configured to generate at least one control signal that prompts a change in the status of a programmable system based on the exception condition. The control signals can prompt an exception handling device to take an action to remedy to the exception condition. The action can include shedding loads that are causing the excessive current consumption, activating a fan or other cooling device to reduce a temperature of the system, or notify a user of the exception condition.

The exception handling device can perform one action to remedy the exception condition immediately or perform a series of actions that gradually or gracefully over time attempt to remedy the exception condition. The gradual or graceful approach is achieved by activating a counter responsive to the exception condition, comparing the counter to a preset priority register, and generating at least one control signal that prompts the change in the status of the programmable system when the counter is equal to a value in the preset priority register.

One of skill in the art will recognize that the concepts taught herein can be tailored to a particular application in many other ways. In particular, those skilled in the art will recognize that the illustrated embodiments are but one of many alternative implementations that will become apparent upon reading this disclosure.

The preceding embodiments are examples. Although the specification may refer to "an", "one", "another", or "some" embodiment(s) in several locations, this does not necessarily mean that each such reference is to the same embodiment(s), or that the feature only applies to a single embodiment.

The invention claimed is:

1. A device comprising:
   a plurality of programmable analog and digital components;
   a core processing unit to configure the plurality of programmable analog and digital components to perform data operations; and
   a transceiving system including a set of the plurality of programmable analog and digital components that are configurable by the processing system, the transceiving system, when initially configured by the processing system, to exchange and monitor status information of the device and one or more remote processing systems through signaling, wherein the set of programmable analog and digital components of the transceiving system are configured to operate independently of the core processing unit to exchange and monitor the status information in that the set of programmable analog and digital components does not involve the core processing unit and does not consume processing resources of the core processing unit to exchange and monitor the status information.

2. The device of claim 1, wherein the transceiving system comprises:
   a transceiver to receive the status information from the one or more remote processing systems through differential signaling; and
   a register to store the received status information and local status information of the device, wherein the received status information pertains to the status information of one or more remote processing systems and the local status information pertains to the status information of the device, wherein the transceiver is configured to transmit contents of the register to the one or more remote processing systems.

3. The device of claim 2, wherein the transceiving system further comprises a direct memory access controller to transfer the received status information to the register or to transfer the status information stored in the register to the one or more remote processing systems according to stored transaction descriptors.

4. The device of claim 3, wherein the direct memory access controller is configured to periodically transfer the status information stored in the register to the one or more remote processing systems.

5. The device of claim 1, further comprising an exception handling circuit to receive control signals when the status information indicates an exception condition in the device or at least one of the one or more remote processing systems, wherein the exception handling circuit is configured to attempt to alleviate the exception condition.

6. The device of claim 5, wherein the exception condition indicates that the device or at least one of the one or more remote processing systems is consuming current over a threshold value, and wherein the exception handling circuit is configured to prompt the device to shed one or more loads consuming current responsive to the exception condition.

7. The device of claim 6, wherein the exception handling circuit is configured to generate an immediate load shedding signal which prompts the device to shed all loads consuming current.

8. The device of claim 6, wherein the exception handling circuit is configured to gracefully shed one or more loads consuming current based on a preconfigured load priority.

9. The device of claim 5, wherein the exception condition indicates that the device or at least one of the one or more remote processing systems has measured a temperature outside a preset range or over a preset temperature threshold, and wherein the exception handling circuit is configured to control activation of one or more temperature control devices responsive to the exception condition.

10. A system comprising:
a plurality of programmable systems that each include a core processing unit to perform various data operations and a plurality of programmable analog and digital components some of which are configured by the core processing unit to operate as a transceiver configured to receive and collect status information of other ones of the plurality of programmable systems through signaling, wherein the transceiver is configured to receive and collect the status information independently of the data operations performed by the core processing unit in that the transceiver does not involve the core processing unit and does not consume processing resources of the core processing unit to receive and collect the status information.

11. The system of claim 10, wherein the plurality of programmable systems are arranged in a ring configuration with each of the plurality of programmable systems exchanging status information with one or more neighboring ones of the plurality of programmable systems.

12. The system of claim 10, further comprising a communication hub to exchange status information with the plurality of programmable systems, wherein the communication hub receives and collects status information from the plurality of programmable systems and transmits the collected status information to the plurality of programmable systems.

13. The system of claim 10, wherein the plurality of programmable systems each include exception handling circuitry to remove one or more exception conditions indicated by the status information.

14. The system of claim 13, wherein the exception conditions indicate that one or more of the plurality of programmable systems, individually or in combination, are consuming current over a threshold value, and wherein the exception handling circuitry for at least one of the plurality of programmable systems is configured to shed one or more loads consuming current responsive to the exception condition.

15. The system of claim 13, wherein the exception conditions indicate that one or more of the plurality of programmable systems has measured a temperature outside a preset range or over a preset temperature threshold, and wherein the exception handling circuitry for at least one of the plurality of programmable systems is configured to control activation of one or more temperature control devices responsive to the exception condition.

16. A method comprising:
receiving status information at a programmable system from a remote processing device with differential signaling, the programming system comprising a core processing unit and a plurality of programmable analog and digital components some of which are configured by the core processing unit as a transceiver to receive the status information;
storing the received status information in a register, wherein the register is configured to store local status information and the received status information, wherein the local status information pertains to the programmable systems and the received status information pertains to the remote processing device; and
transmitting the received status information and the local status information to at least another remote processing device with differential signaling, wherein said receiving, storing, and transmitting is performed without involving and consuming resources of the core processing unit for said receiving, storing, and transmitting.

17. The method of claim 16, wherein the status information is received and transmitting with differential signaling based, at least in part, on a low voltage differential signal (LVDS) specification.

18. The method of claim 16 further comprises:
monitoring the status information stored in the register to determine when an exception condition occurs; and
generating at least one control signal that prompts a change in the status of a programmable system based on the exception condition.

19. The method of claim 18 further comprises:
activating a counter responsive to the exception condition;
comparing the counter to a preset priority register; and
generating at least one control signal that prompts the change in the status of the programmable system when the counter is equal to a value in the preset priority register.

20. The method of claim 16 further comprises transmitting the received status information and the local status information to a centralized hub that relays the received status information and the local status information to the at least another remote processing device.

* * * * *